United States Patent
MaGill et al.

(10) Patent No.: US 9,489,497 B2
(45) Date of Patent: Nov. 8, 2016

(54) SYSTEMS AND METHODS FOR NETWORK RISK REDUCTION

(71) Applicant: EQUIFAX INC., Atlanta, GA (US)

(72) Inventors: Adam MaGill, Canton, GA (US); Benjamin Smith, Kirkheaton (GB); Nicholas Nedostup, Alpharetta, GA (US); Anthony Spinelli, Alpharetta, GA (US)

(73) Assignee: EQUIFAX, INC., Atlanta, GA (US)

( * ) Notice: Subject to any disclaimer, the term of this patent is extended or adjusted under 35 U.S.C. 154(b) by 636 days.

(21) Appl. No.: 13/835,611

(22) Filed: Mar. 15, 2013

(65) Prior Publication Data

US 2014/0189098 A1   Jul. 3, 2014

Related U.S. Application Data

(60) Provisional application No. 61/746,813, filed on Dec. 28, 2012.

(51) Int. Cl.
  *G06F 21/10*    (2013.01)
  *G06F 21/60*    (2013.01)
  *H04L 29/06*    (2006.01)

(52) U.S. Cl.
  CPC ............ *G06F 21/10* (2013.01); *G06F 21/604* (2013.01); *H04L 63/1425* (2013.01); *H04L 63/20* (2013.01)

(58) Field of Classification Search
  CPC ...... G06Q 10/00; G06Q 20/00; G06Q 30/00; G06Q 40/00
  USPC ........................................ 705/3–44; 709/224
  See application file for complete search history.

(56) References Cited

U.S. PATENT DOCUMENTS

| | | |
|---|---|---|
| 6,785,661 B1 | 8/2004 | Mandler et al. |
| 7,028,052 B2 | 4/2006 | Chapman et al. |

(Continued)

FOREIGN PATENT DOCUMENTS

| | | |
|---|---|---|
| JP | 2001101212 | 4/2001 |
| KR | 1020110053185 | 5/2011 |

(Continued)

OTHER PUBLICATIONS

Transunion / SmartMove Click.Check.Rent, http://www.mysmartmove.com, Sep. 16, 2008 (1 page).

(Continued)

*Primary Examiner* — Frantzy Poinvil
(74) *Attorney, Agent, or Firm* — Robert J. Curylo; Kilpatrick Townsend & Stockton LLP

(57) ABSTRACT

Reducing risks associated with network usage is provided. Variable information is extracted from network activity log data that includes a request from a user in an organization for content from a network content source. The variable information includes a number of times that the network content source has been requested, a volume of organization users that have made a request from the network content source, and a period of time for which traffic with respect to the network content source has been detected. The variable information is scored to generate a risk score. An access control level is determined for the network content source based on the risk score and a content access policy for the organization. Access of the user in the organization to the network content source is controlled according to the access control level.

17 Claims, 6 Drawing Sheets

(56) References Cited

U.S. PATENT DOCUMENTS

| | | | |
|---|---|---|---|
| 7,155,514 B1* | 12/2006 | Milford | H04L 41/06 370/236 |
| 7,364,073 B2 | 4/2008 | Webb | |
| 7,542,993 B2 | 6/2009 | Satterfield et al. | |
| 7,841,004 B1 | 11/2010 | Balducci et al. | |
| 8,086,525 B2 | 12/2011 | Atwood et al. | |
| 8,271,894 B1 | 9/2012 | Mayers | |
| 8,286,239 B1 | 10/2012 | Sutton | |
| 8,661,062 B1* | 2/2014 | Jamail | G06F 21/554 707/802 |
| 8,850,536 B2* | 9/2014 | Liberman | H04L 9/0866 713/186 |
| 8,862,610 B2* | 10/2014 | Cheng | G06F 17/30864 706/12 |
| 2002/0147805 A1* | 10/2002 | Leshem | G06F 11/32 709/223 |
| 2003/0018558 A1 | 1/2003 | Heffner et al. | |
| 2003/0139990 A1 | 7/2003 | Greco | |
| 2003/0212618 A1 | 11/2003 | Keyes et al. | |
| 2004/0210527 A1 | 10/2004 | Woda et al. | |
| 2004/0215757 A1* | 10/2004 | Butler | H04L 67/18 709/223 |
| 2004/0245330 A1 | 12/2004 | Swift et al. | |
| 2005/0065872 A1 | 3/2005 | Moebs et al. | |
| 2005/0119961 A1 | 6/2005 | Tanzillo et al. | |
| 2006/0074793 A1 | 4/2006 | Hibbert et al. | |
| 2006/0117028 A1* | 6/2006 | Harrison | H04L 12/2602 |
| 2006/0184393 A1 | 8/2006 | Ewin et al. | |
| 2006/0226216 A1 | 10/2006 | Keithley et al. | |
| 2006/0293981 A1 | 12/2006 | McNelley et al. | |
| 2007/0226130 A1 | 9/2007 | Haggerty et al. | |
| 2008/0120699 A1 | 5/2008 | Spear | |
| 2008/0126233 A1 | 5/2008 | Hogan | |
| 2008/0288330 A1 | 11/2008 | Hildebrand et al. | |
| 2009/0089803 A1 | 4/2009 | Biggs | |
| 2009/0125427 A1 | 5/2009 | Atwood et al. | |
| 2009/0300711 A1 | 12/2009 | Tokutani et al. | |
| 2010/0205005 A1 | 8/2010 | Pritchett et al. | |
| 2010/0241559 A1 | 9/2010 | O'Connor et al. | |
| 2010/0250411 A1 | 9/2010 | Ogrodski et al. | |
| 2010/0269168 A1 | 10/2010 | Hegli et al. | |
| 2010/0318604 A1 | 12/2010 | Stafie et al. | |
| 2011/0212430 A1 | 9/2011 | Smithmier et al. | |
| 2011/0239278 A1 | 9/2011 | Downey et al. | |
| 2012/0102545 A1 | 4/2012 | Carter, III et al. | |
| 2012/0144198 A1 | 6/2012 | Har et al. | |
| 2012/0330837 A1 | 12/2012 | Persaud et al. | |
| 2013/0159446 A1 | 6/2013 | Carlson et al. | |
| 2013/0311326 A1 | 11/2013 | Lucas et al. | |
| 2014/0189003 A1 | 7/2014 | Schoenrock | |

FOREIGN PATENT DOCUMENTS

| | | |
|---|---|---|
| WO | 2006002358 A2 | 1/2006 |
| WO | 2006080914 A1 | 8/2006 |
| WO | 2009059116 A2 | 5/2009 |
| WO | 2009059116 A3 | 6/2009 |
| WO | 2012167165 | 12/2012 |
| WO | 2014105538 | 7/2014 |
| WO | 2014105673 | 7/2014 |

OTHER PUBLICATIONS

TransUnion's Smart Move Provides Independent Rental Owners With New Level of Risk Insight, Transunion, http://newsroom.transunion.com/index.php?s=43&item=487, Sep. 16, 2008 (2 pages).

European Patent Application No. 13866968.4, European Search Report, mailed Jul. 6, 2016, 8 pages.

PCT Patent Application No. PCT/US2013/075901, International Search Report and Written Opinion mailed on Apr. 8, 2014, 10 pages.

PCT Patent Application No. PCT/US2013/076810, International Search Report and Written Opinion mailed on Mar. 26, 2014, 9 pages.

European Patent Application No. 13867871.9, Extended European Search Report, mailed Aug. 8, 2016, 8 pages.

* cited by examiner

SYSTEMS AND METHODS FOR NETWORK RISK REDUCTION

CROSS-REFERENCE TO RELATED APPLICATIONS

This application claims priority to U.S. Provisional Application Ser. No. 61/746,813, filed Dec. 28, 2012 and titled "Systems and Methods for Network Risk Reduction," the entirety of which is incorporated herein by reference.

TECHNICAL FIELD

The present disclosure generally relates to computer-implemented systems and methods for reducing risks associated with network communication for an organization.

BACKGROUND

Networks can involve electronic sharing of content. Systems and methods are desirable that can analyze data to reduce risks for an organization in connection with electronic sharing of content with sources external to the organization.

SUMMARY

In one aspect, variable information is extracted from network activity log data on a processing device. The network activity log data includes a content access request from a user in an organization for a network content source. The variable information includes a number of times that content from the network content source has been requested, a volume of organization users that have made a request for content from the network content source, and a period of time for which traffic with respect to the network content source has been detected. The variable information is scored to generate a risk score that indicates for the organization a relative risk associated with the network content source. An access control level is determined for the network content source based on the risk score and a content access policy for the organization. Access of the user in the organization to the network content source is controlled according to the access control level.

In another aspect a system includes a server device. The server device includes a processor and a non-transitory computer-readable storage medium containing instructions which when executed on the processor cause the processor to perform operations. The operations include:

extracting variable information from network activity log data that includes a content access request from a user in an organization for a network content source, the variable information including a number of times that content from the network content source has been requested, a volume of organization users that have made a request for content from the network content source, and a period of time for which traffic with respect to the network content source has been detected;

scoring the variable information to generate a risk score that indicates for the organization a relative risk associated with the network content source;

determining an access control level for the network content source based on the risk score and a content access policy for the organization; and controlling access of the user in the organization to the network content source according to the access control level.

In another aspect, a computer-program product tangibly embodied in a non-transitory machine readable storage medium is provided that includes instructions configured to cause a data processing apparatus to:

extract variable information from network activity log data that includes a content access request from a user in an organization for a network content source, the variable information including a number of times that content from the network content source has been requested, a volume of organization users that have made a request for content from the network content source, and a period of time for which traffic with respect to the network content source has been detected;

score the variable information to generate a risk score that indicates for the organization a relative risk associated with the network content source;

determine an access control level for the network content source based on the risk score and a content access policy for the organization; and control access of the user in the organization to the network content source according to the access control level.

The details of one or more aspects and examples are set forth in the accompanying drawings and the description below. Other features and aspects will become apparent from the description, the drawings, and the claims.

DETAILED DESCRIPTION

Figure 1:
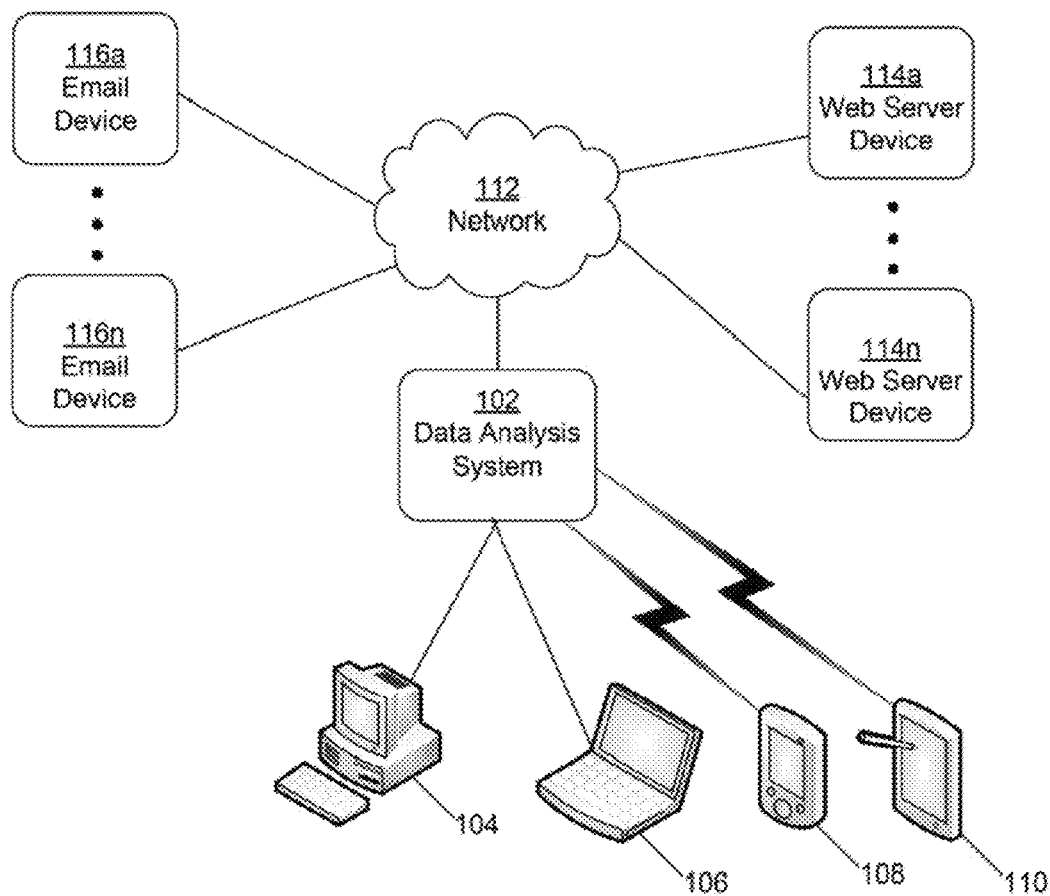
FIG. 1 depicts an example of an environment that includes a data analysis system.

Certain aspects include systems and methods for reducing risks associated with network usage, such as accessing content from Internet domain addresses and/or email. Risks may include executable content included in a webpage or email that may deliver malware, spyware, or other undesirable programming to a device within an organization's network. Reducing risk of user browsing and emailing habits, for example, can be achieved at least in part by analyzing Internet browsing and emailing habits of an organization's users (e.g., employees) by way of traffic logs. A safety or risk rating of an internet domain/email sender can be derived by evaluating certain factors determined from the traffic logs. Such factors may include (A) the number of times that users within the organization made requests to the domain/sender, (B) the volume of users within the organization making a request to the domain/sender, and (C) the period of time that requests by users within the organization to the domain/sender have been made.

By statistically analyzing the factors, a relative score can be derived for an Internet domain (or an email sender or recipient as the case may be). The score can be leveraged in conjunction with existing policy enforcement points, such as proxy servers, to take a defined action. The action can include allowing access to the domain/sender but limiting content that users within the organization are able to receive from the domain/sender until the score associated with the domain/sender increases. For example, users within an organization can be incentivized to access a domain even though the accessible content from that domain might be limited so that the domain will be considered "safe" such that attempting to circumvent security by the user is unnecessary. In some aspects, a score can be computed for a domain and the action can be applied substantially in real time with respect to a request from a user within the organization to that domain.

A domain can be perceived to be risky at first, but can be later considered "safe" by, for example, more users within an organization accessing the domain over time. For example, the system can ascertain over time with a relatively high degree of assurance that a domain is of higher risk (e.g., not accessed often, accessed only by a few users within the organization, and only over a short period of time) or of less risk (e.g., accessed often by many users within the organization over a longer period of time). Defenses to risks can be driven in part by group dynamics of users within an organization. Systems according to some aspects can evaluate risk according to a number of users within the organization without necessarily being so intrusive as using reports with the exact content accessed by the user.

By leveraging analysis through an automated system, an organization may be able to restrict active content from a domain or email sender dynamically, thereby reducing the organization's risk exposure. The analysis and scoring for domains and emails can be different for different organizations, depending on what is "known" within an organization and desired policies for an organization. For example, domains frequently accessed by users within organization A may not be accessed, typically, by users within organization B, such as those same domains may be scored lower for organization B. Furthermore, one organization may require domains to be accessed for a longer period of time than another organization before such domains are considered "safe."

FIG. 1 is an example of an environment in which certain aspects may be implemented using a data analysis system 102. The data analysis system 102 may be for an organization and can communicate via wireline and/or wireless communication with organization devices used by users within the organization. The organization devices as shown in FIG. 1 include a computer 104, a laptop 106, a mobile computing device 108, and a tablet computer 110. Other types of devices can be used. The data analysis system 102 can communicate through a network 112 with network content sources, such as web server devices 114a-n and email devices 116a-n, that are external to the organization. The web server devices 114a-n can provide web pages that include content in response to requests from users of the organization devices. The email devices 116a-n can provide emails that include content to users of the organization devices. The data analysis system 102 can analyze traffic between the organization devices and the web server devices 114a-n and email devices 116a-n, and may be configured to perform actions such as limiting content that is delivered to organization devices within the organization.

Figure 2:
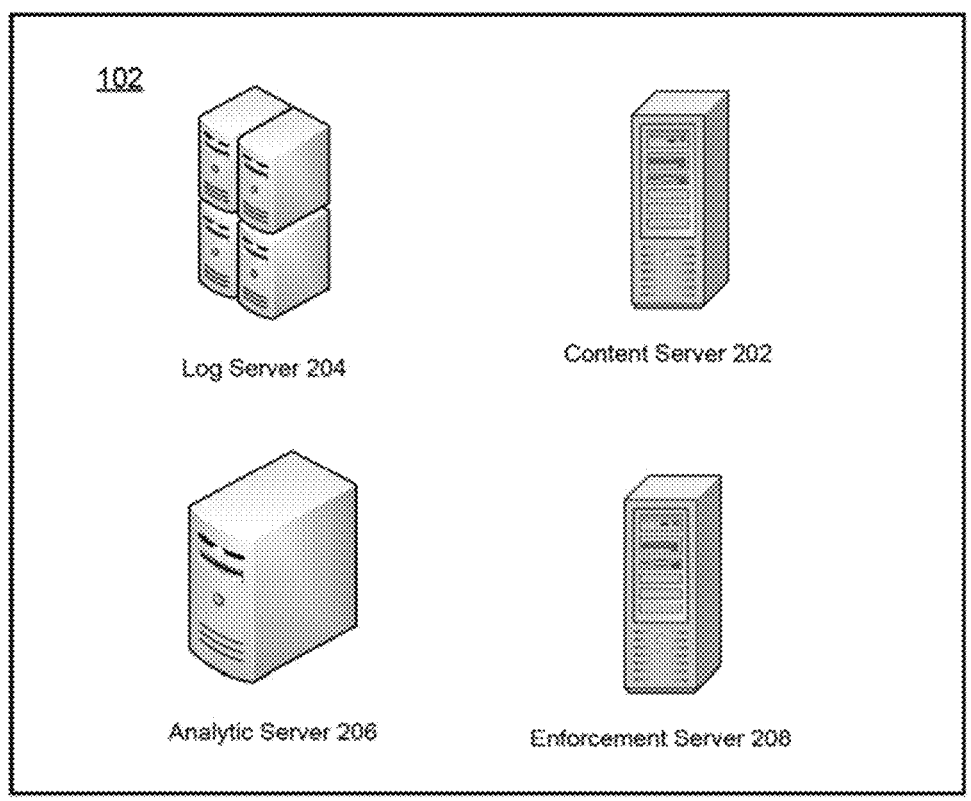
FIG. 2 depicts an example of a data analysis system that includes multiple servers.

The data analysis system 102 can include one device or multiple devices that together analyze network activity data and control access to network content sources based on relative risks. FIG. 2 depicts an example of the data analysis system 102 that includes multiple servers. The servers include a content server 202, a log server 204, an analytic server 206, and an enforcement server 208. The content server 202 can receive requests from organization users for content from network content sources. The log server 204 can determine variable information from log data, including the requests for content, received from the content server 202. The analytic server 206 can generate risk scores from the variable information. The enforcement server 208 can determine access control levels for the network content sources based on the risk scores.

Figure 3:
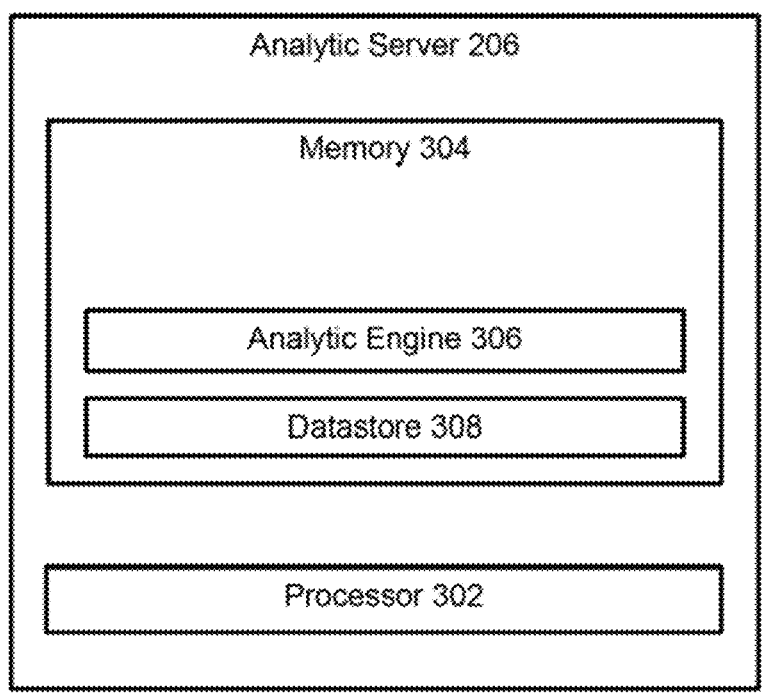
FIG. 3 is a block diagram of an example of an analytic server.

FIG. 3 depicts a block diagram with an example of the analytic server 206. Other implementations may be utilized, such as implementations that include multiple devices, each configured for performing selected functions.

The analytic server 206 includes a processor 302 that can execute code stored on a tangible computer-readable medium in a memory 304, to cause the analytic server 206 to perform functions. The analytic server 206 may include any device that can process data and execute code that is a set of instructions to perform functions. Examples of the devices include a database server, a web server, desktop personal computer, a laptop personal computer, a server device, a handheld computing device, and a mobile device.

Examples of the processor 302 include a microprocessor, an application-specific integrated circuit (ASIC), a state machine, or other suitable processor. The processor 302 may include one processor or any number of processors. The processor 302 can access code stored in the memory 304 via a bus. The memory 304 may be any non-transitory computer-readable medium configured for tangibly embodying code and can include electronic, magnetic, or optical devices. Examples of the memory 304 include random access memory (RAM), read-only memory (ROM), a floppy disk, compact disc, digital video device, magnetic disk, an ASIC, a configured processor, or other storage device.

Instructions can be stored in the memory 304 as executable code. The instructions can include processor-specific instructions generated by a compiler and/or an interpreter from code written in any suitable computer-programming language. The instructions can include one or more applications, such as an analytic engine 306, that, when executed by the processor 302, can cause the analytic server 206 to perform functions. The analytic engine 306 can be executed for scoring variable information (i.e., factors) in accordance with an organization's security policy. Also included in memory 304 may be a datastore 308 that can store information received by the analytic server 206 and information derived by the analytic server 206.

Each of the content server 202, log server 204, and enforcement server 208 may be similar to the analytic server 206 of FIG. 3. The content server 202 may include a content request engine that generates logs including content requests and associated information. The log server 204 can include an intelligence engine that can derive variable information from the logs. The enforcement server 208 can include an action engine that can limit access to content from a network content source based on a risk score.

Figure 4:
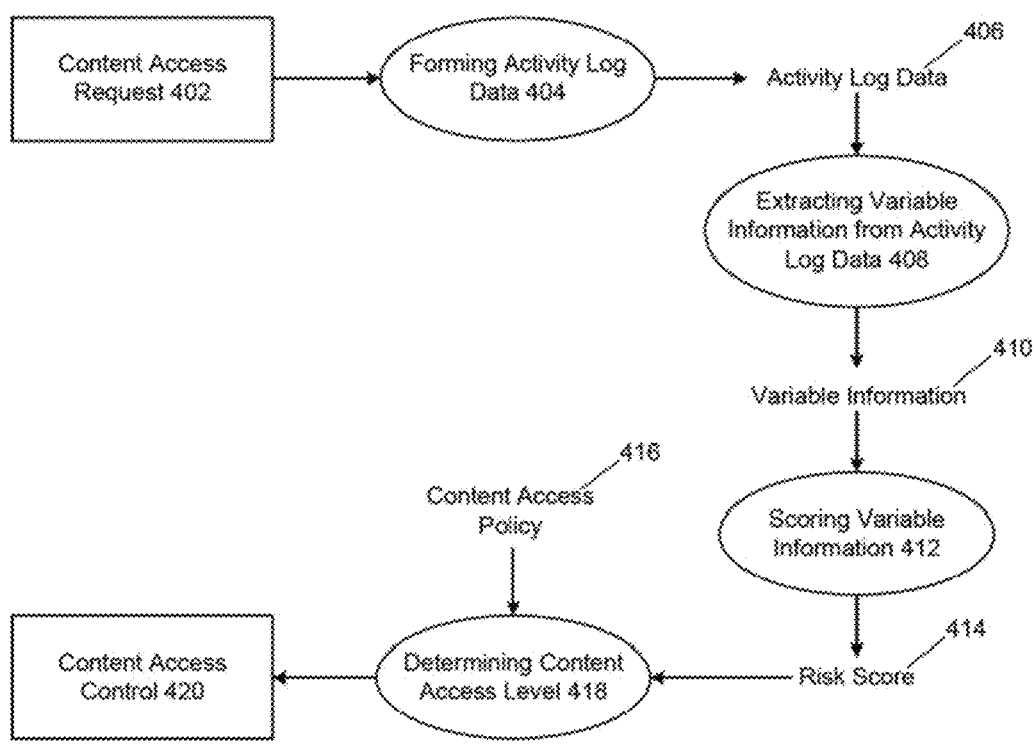
FIG. 4 is a data flow diagram of example data processing in connection with an organization user request for content from a network content source.

FIG. 4 is a data flow diagram that includes an example of processes of the data analysis system 102 in connection with an organization user request for content from a network content source. The data flow diagram is described with reference to FIGS. 1-3, but other implementations can be used.

A content access request 402 from an organization device controlled by an organization user can be received by the content server 202 in the data analysis system 102. The content access request 402 may be a request for content from a web server device or for email from an email device and can include the username of the organization user making the request.

The content server 202 performs a process 404 of forming activity log data using the content access request. The activity log data 406 can include network activity for users within the organization. Network activity can include requests for web content and/or requests for receiving emails from sources outside of the organization. In some aspects, the content server 202 generates the activity log data 406 as flat file proxy activity logging data.

The log server 204 performs a process 408 of extracting variable information from activity log data. Variable information 410 can include the number of times that content from the network content source has been requested, the volume of organization users that have made a request for content from the network content source, and a period of time for which traffic with respect to the network content source has been detected.

Figure 5:
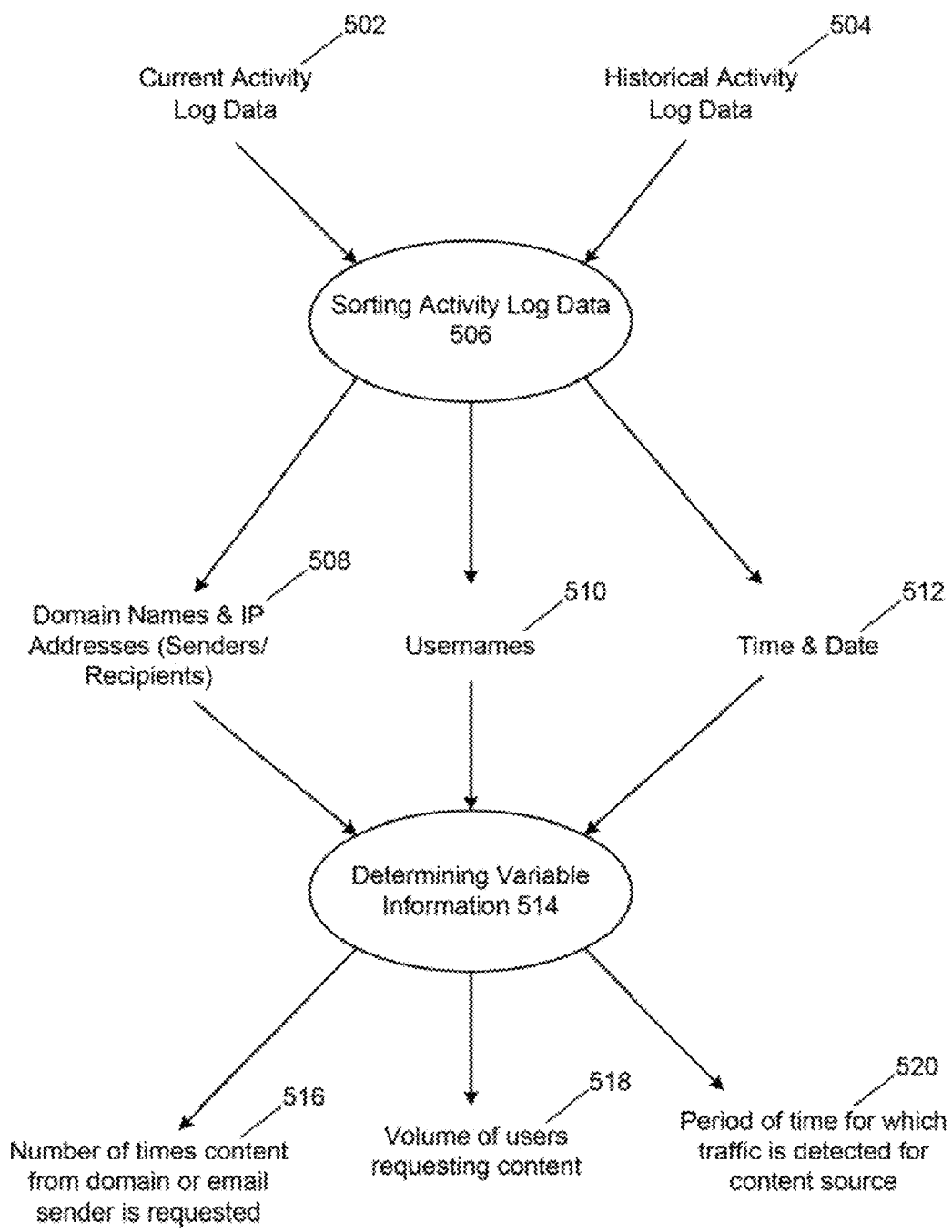
FIG. 5 is a data flow diagram of an example of a process for extracting variable information from activity log data.

FIG. 5 depicts a data flow diagram of an example of a process for extracting variable information from activity log data. The activity log data can include current activity log data 502 and historical activity log data 504. The current activity log data 502 may be network activity substantially contemporaneous to process, or otherwise the most current request for content from the network content source. The historical activity log data 504 may be network activity that has occurred previously for a pre-set amount of time prior to the most current request for content from the network content source.

The log server 204 performs a process 506 of sorting the activity log data. For example, the log server 204 can execute filtering process on the activity log data to identify the activity log data associated with the same network content source as the network content source from which content is currently being requested. The output of the sorting process may be data attributes about the network content source, such as the domain name and Internet Protocol ("IP") address of the network content source (or identification of the email sender or recipient, as the case may be) 508, usernames of the organization users that have or are requesting content from the network content source 510, and the times and dates of the requests 512.

The log server 204 performs a process 514 of determining variable information from the data attributes. The variable information can include the number of times content is requested from the network content source such as the web domain or email sender 516, the volume of users requesting content from the network content source 518, and the period of time for which network traffic is detected for the network content source 520. Other types of variable information, such as whether a domain was accessed using the domain name or an IP address inserted into a web browser, may alternatively or also be derived. The log server 204 may derive the variable information from the data attributes by, for example, applying fuzzy logic or another data analytic process to the data attributes.

Returning to FIG. 4, the analytic server 206 performs a process 412 of scoring the variable information to generate a risk score 414. In some aspects, the risk score 414 is determined by multiplying each type of variable information by a pre-selected weight and then multiplying each type of weighted variable information. The analytic engine 306 of the analytic server 206 can score the variable information in accordance with a security policy of an organization that may specify, for example, the relative weight that should be applied to each type of variable information. The score can be used to assess the relative safety of the domain, email sender, or other type of network content source.

The enforcement server 208 performs a process 418 of determining a content access level for the network content source based on the risk score 414 and a content access policy 416 of the organization. The content access level can include allowing full access to content from the network content source, allowing access to some, but not all, content from the network content source, or preventing access to content from the network content source. The content access policy 416 may specify a risk threshold of the organization. In some aspects, the content access level is determined by comparing the risk score 414 to the risk threshold in the content access policy 416 of the organization. The enforcement server 208 can output a content access control command 420 that can implement the content access level for the network content source, such as by limiting the content that the organization user can receive from the network content source.

In some aspects, many users making requests to a network content source over the course of a significant amount of time can result in the data analysis system 102 determining that the network content source is a safe content source such that full access to content from the network content source is allowed for users within the organization. A network content source may be initially classified as unsafe such that the data analysis system 102 limits the content that an organization user can receive from the network content source. At a later time, the score for the network content source may change based on the values of the one or more of the types of variables and cause the classification of the network content source to change to "safe," such that the data analysis system 102 allows all or most content to be received from the network content source.

Figure 6:
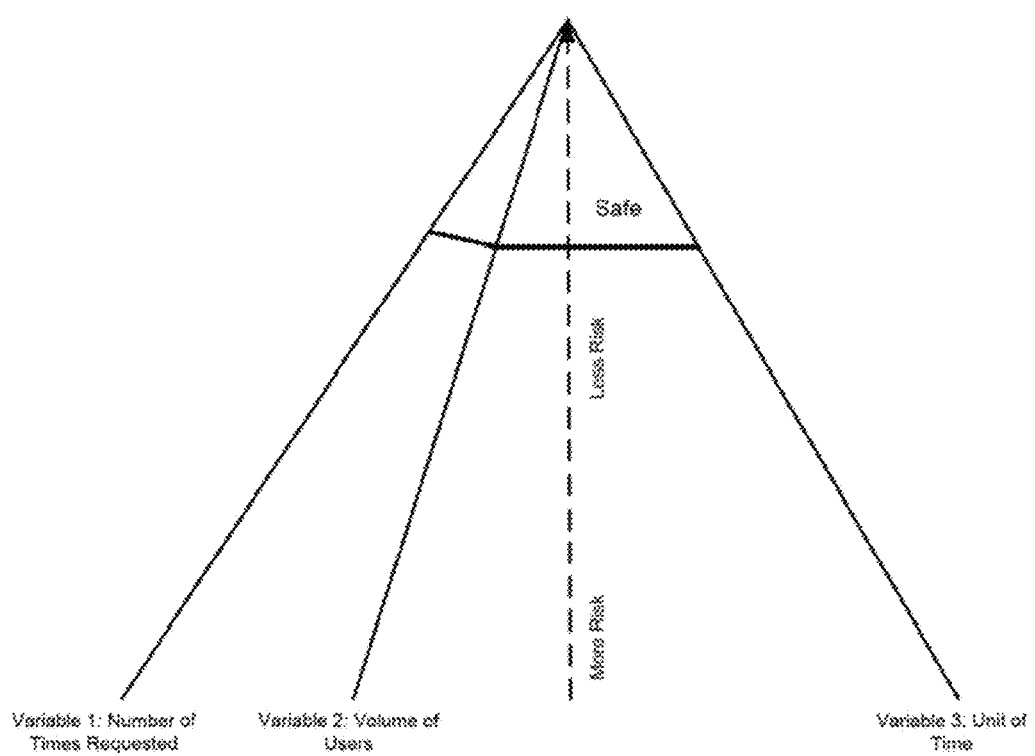
FIG. 6 is a risk pyramid depicting an example of a continuum of safety that may be associated with a network content source outside of an organization's network.

FIG. 6 is a risk pyramid depicting an example of a continuum of safety that may be associated with a network content source outside of an organization's network. As the number of users requesting the network content source increases, the volume of users requesting the network content source increases, and the amount of time, such as the number of days, during which the network content source is accessed increases, the network content source can be classified from more risk, to less risk, and then to a safe classification. The data analysis system 102 can limit content from being received from the network content source at a level that depends on the risk level associated with the network content source. For example, if the network content source is classified as highly risky (e.g., at the bottom of the continuum), more content and more types of content can be prevented from being received from the network content source as compared to a network content source that is classified as less risky, but not yet as a safe network content source.

Each of the types of variables may have a different slope than the linear slopes represented in the pyramid. The slope, for example, can represent the weighting that can be applied to the factors based on an organization's access policy, which may associate more weight to one type of variable than other types of variables. For example, a type of variable associated with a low weight may have a steeper slope such that less extensive increases are needed for that type of variable for a network content source to become closer to being classified as a safe network content source. The weight can be equated to the relative risk tolerance on an organization-by-organization basis.

In some aspects, an increase in all three types of variables is needed for a network content source to become closer to being classified as a safe network content source. For example, an increase in the number of times that a network content source is requested and in the volume of users requesting the network content source without an increase in the period of time for such requests may not improve the relative risk rating for the network content source. Furthermore, a network content source may also become more risky over time if, for example, levels in one or more of the types of variables decreases.

Certain aspects of the subject matter and the functional operations described in this specification can be implemented in digital electronic circuitry, or in computer software, firmware, or hardware, including the structures disclosed in this specification and their structural equivalents, or in combinations of one or more of them. Certain aspects of the subject matter described in this specification can be implemented as one or more computer program products, i.e., one or more modules of computer program instructions encoded on a computer readable medium for execution by, or to control the operation of, data processing apparatus.

The computer readable medium can be a machine readable storage device, a machine readable storage substrate, a memory device, a composition of matter effecting a machine readable propagated communication, or a combination of one or more of them. The term "data processing device" encompasses all apparatus, devices, and machines for processing data, including by way of example a programmable processor, a computer, or multiple processors or computers. The device can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code), can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., on or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and a device can also be implemented as, special purpose logic circuitry, e.g., an FPGA (field programmable gate array) or an ASIC.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, certain aspects of the subject matter described in this specification can be implemented on a computer having a display device, e.g., a CRT (cathode ray tube) to LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any from, including acoustic, speech, or tactile input.

Certain aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specifics, these should not be construed as limitations on the scope or of what may be claimed in an application or patent claiming priority hereto or otherwise, but rather as descriptions of features specific to particular aspects. Certain features that are described in this specification in the context or separate aspects can also be implemented in combination in a single implementation. Conversely, various features that are described in the context of a single aspect can also be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects and examples described above should not be understood as requiring such separation in all aspects and examples, and it should be understood that the described program components and systems can generally be integrated together in a single software product or packaged into multiple software products.

What is claimed is:

1. A computer-implemented method for controlling access to electronic content over a data network, comprising:
   extracting, from a database and using a processing device that is executing instructions stored on a computer-readable storage medium, variable information from network activity log data, wherein the network activity log data comprises (i) current activity log data that includes a content access request from a user in an organization for a network content source on a content server and (ii) historical activity log data that includes prior activity for a network, the variable information including a number of times that content from the network content source has been requested, a volume of organization users that have made a request for content from the network content source, and a period of time for which traffic with respect to the network content source has been detected;
   sorting the network activity log data into data attributes;
   determining the variable information for the network content source from the data attributes;
   scoring the variable information to generate a risk score that indicates for the organization a relative risk associated with the network content source;
   determining an access control level for the network content source based on the risk score and a content access policy for the organization; and
   controlling remote access of the user in the organization to the network content source via the data network according to the access control level, wherein controlling the remote access comprises configuring a server to perform at least one of:
      rejecting requests for content from the network content source that are received via the data network from a computing device associated with the user, wherein the requests are rejected based on the user lacking the access control level determined from the risk score and the content access policy, or
      responding to the requests by permitting, via the data network, access to the content to the computing device from the network content source based on the user having the access control level determined from the risk score and the content access policy.

2. The method of claim 1, wherein the network content source is a web server that provides web content.

3. The method of claim 1, wherein the network content source is an email account external to the organization.

4. The method of claim 1, wherein the content access policy includes a risk threshold for the organization against which the risk score is compared to determine the access control level.

5. The method of claim 1, wherein the risk score for the network content source is different at a second time that is after a first time that the risk score is determined for the network content source.

6. The method of claim 1, further comprising:
   forming the network activity log data using the content access request from the user in the organization.

7. The method of claim 1, wherein the data attributes include network content source identification, usernames of users of the organization in the network activity log data, and times and dates of access to the network content source.

8. The method of claim 1, wherein controlling the remote access of the user in the organization to the network content source according to the access control level includes allowing some but not all of the content from the network content source to be received via the data network by an organization device controlled by the user in the organization.

9. A system, comprising:
   a server device that includes:
      a processor; and
      a non-transitory computer-readable storage medium containing instructions that when executed on the processor cause the processor to perform operations including:
         extracting, from a database, variable information from network activity log data, wherein the network activity log data comprises (i) current activity log data that includes a content access request from a user in an organization for a network content source on a content server and (ii) historical activity log data that includes prior activity for a network, the variable information including a number of times that content from the network content source has been requested, a volume of organization users that have made a request for content from the network content source, and a period of time for which traffic with respect to the network content source has been detected;
         sorting the network activity log data into data attributes;
         determining the variable information for the network content source from the data attributes;
         scoring the variable information to generate a risk score that indicates for the organization a relative risk associated with the network content source;
         determining an access control level for the network content source based on the risk score and a content access policy for the organization; and
         controlling remote access of the user in the organization to the network content source via a data network according to the access control level, wherein controlling the remote access comprises configuring a server to perform at least one of:
            rejecting requests for content from the network content source that are received via the data network from a computing device associated with the user, wherein the requests are rejected based on the user lacking the access control level determined from the risk score and the content access policy, or
            responding to the requests by permitting, via the data network, access to the content to the computing device from the network content source based on the user having the access control level determined from the risk score and the content access policy.

10. The system of claim 9, wherein the network content source is a web server that provides web content.

11. The system of claim 9, wherein the network content source is an email account external to the organization.

12. The system of claim 9, wherein the content access policy includes a risk threshold for the organization against which the risk score is comparable to determine the access control level.

13. The system of claim 9, wherein the risk score for the network content source is different at a second time that is after a first time that the risk score is determined for the network content source.

14. The system of claim 9, wherein the operations further include:
   forming the network activity log data using the content access request from the user in the organization.

15. The system of claim 9, wherein the data attributes include network content source identification, usernames of users of the organization in the network activity log data, and times and dates of access to the network content source.

16. The system of claim 9, wherein controlling the remote access of the user in the organization to the network content source according to the access control level includes allowing some but not all of the content from the network content source to be received via the data network by an organization device controlled by the user in the organization.

17. A computer-program product tangibly embodied in a non-transitory machine readable storage medium, including instructions configured to cause a data processing apparatus to:
   extract, from a database, variable information from network activity log data, wherein the network activity log data comprises (i) current activity log data that includes a content access request from a user in an organization for a network content source on a content server and (ii) historical activity log data that includes prior activity for a network, the variable information including a number of times that content from the network content source has been requested, a volume of organization users that have made a request for content from the network content source, and a period of time for which traffic with respect to the network content source has been detected;
   sorting the network activity log data into data attributes;
   determining the variable information for the network content source from the data attributes;
   score the variable information to generate a risk score that indicates for the organization a relative risk associated with the network content source;
   determine an access control level for the network content source based on the risk score and a content access policy for the organization; and
   control remote access of the user in the organization to the network content source via a data network according to the access control level, wherein controlling the access comprises configuring a server to perform at least one of:
      rejecting requests for content from the network content source that are received via the data network from a computing device associated with the user, wherein the requests are rejected based on the user lacking the access control level determined from the risk score and the content access policy, or
      responding to the requests by permitting, via the data network, access to the content to the computing device from the network content source based on the user having the access control level determined from the risk score and the content access policy.

\* \* \* \* \*